(12) United States Patent
Kuroishi

(10) Patent No.: US 8,739,849 B2
(45) Date of Patent: Jun. 3, 2014

(54) PNEUMATIC TIRE

(75) Inventor: Kazuya Kuroishi, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 12/810,573

(22) PCT Filed: Dec. 26, 2008

(86) PCT No.: PCT/JP2008/073737
§ 371 (c)(1),
(2), (4) Date: Jul. 29, 2010

(87) PCT Pub. No.: WO2009/084633
PCT Pub. Date: Jul. 9, 2009

(65) Prior Publication Data
US 2011/0041971 A1   Feb. 24, 2011

(30) Foreign Application Priority Data
Dec. 28, 2007   (JP) ................. 2007-340681

(51) Int. Cl.
*B60C 13/02* (2006.01)

(52) U.S. Cl.
USPC .......................................... 152/523; 152/153

(58) Field of Classification Search
CPC ........ B60C 13/00; B60C 13/01; B60C 13/02; B60C 2013/02
USPC .............................. 152/153, 523; 12/153, 523
See application file for complete search history.

(56) References Cited

U.S. PATENT DOCUMENTS

| | | | | |
|---|---|---|---|---|
| 2,146,942 A | * | 2/1939 | Czerwin | 152/153 |
| 4,343,342 A | * | 8/1982 | McDonald | 152/523 |
| 5,259,431 A | | 11/1993 | Housiaux | |
| 5,303,758 A | * | 4/1994 | Clementz et al. | 152/523 |
| 5,645,660 A | * | 7/1997 | Attinello et al. | 152/523 |
| 6,460,584 B1 | * | 10/2002 | de Labareyre | 152/154 |
| 2007/0034312 A1 | * | 2/2007 | Matsumoto | 152/523 |
| 2009/0032161 A1 | | 2/2009 | Yamaguchi | |
| 2010/0193101 A1 | | 8/2010 | Miyasaka et al. | |

FOREIGN PATENT DOCUMENTS

| | | |
|---|---|---|
| DE | 39 40 439 A1 | 6/1991 |
| JP | 2001-039129 A | 2/2001 |
| JP | 2006-076431 A | 3/2006 |

(Continued)

OTHER PUBLICATIONS

European Search Report issued in European Application No. 08868031.9, dated Jul. 6, 2011, 6 pages.

(Continued)

*Primary Examiner* — Justin Fischer
*Assistant Examiner* — Robert Dye
(74) *Attorney, Agent, or Firm* — Sughrue Mion, PLLC

(57) ABSTRACT

Provided is a pneumatic tire including at least a turbulent flow generation projection configured to generate a turbulent flow, the turbulent flow generation projection being arranged in a range from a maximum tire width position to an outside bead position, the maximum tire width position being a position on a tire surface with maximum tire width, and the outside bead position being a position on an outside of a bead portion in a tire radial direction, the bead portion configured to be in contact with a rim flange. The turbulent flow generation projection includes a radial projection extending along the tire radial direction, and a circumferential projection extending in an approximately circular arc shape along a tire circumferential direction.

13 Claims, 13 Drawing Sheets

(56) References Cited

FOREIGN PATENT DOCUMENTS

| | | | |
|---|---|---|---|
| JP | 2007-069890 | * | 3/2007 |
| JP | 2009-029379 A | | 2/2009 |
| WO | 2007/032405 A1 | | 3/2007 |
| WO | 2009/017166 A1 | | 2/2009 |
| WO | 2009/017167 A1 | | 2/2009 |

OTHER PUBLICATIONS

International Search Report dated Mar. 24, 2009 (with translation) (8 pages).
Japanese Office Action issued Apr. 3, 2012 for counterpart Japanese Application No. 2007-340681.

* cited by examiner

FIG. 5
(a)
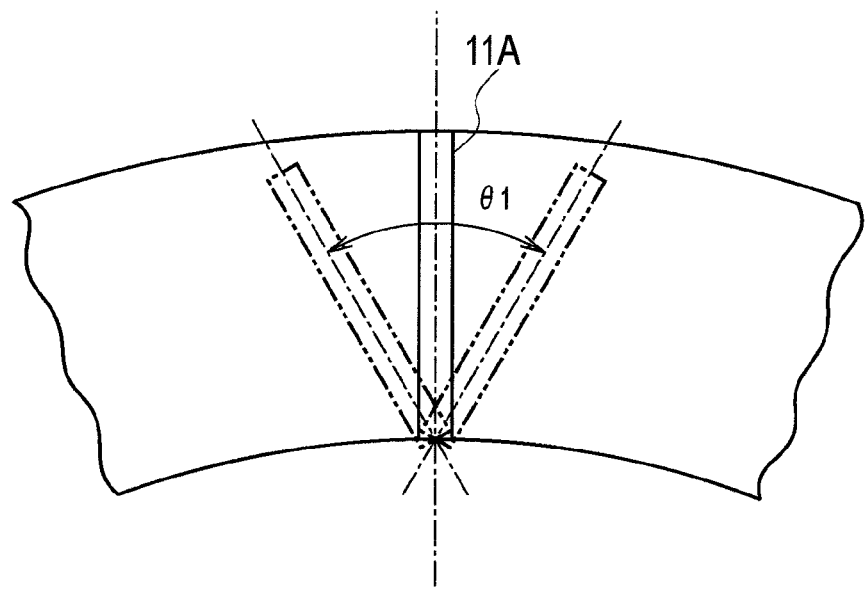
(b)
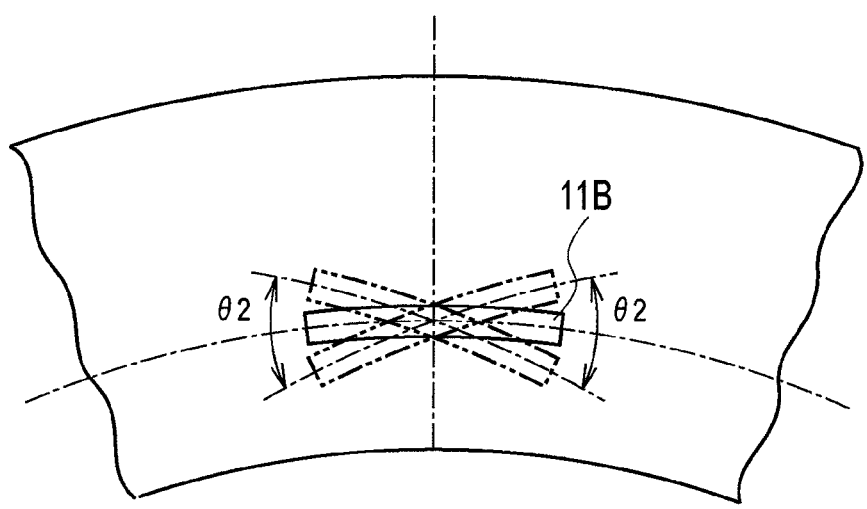

FIG. 16
(a)
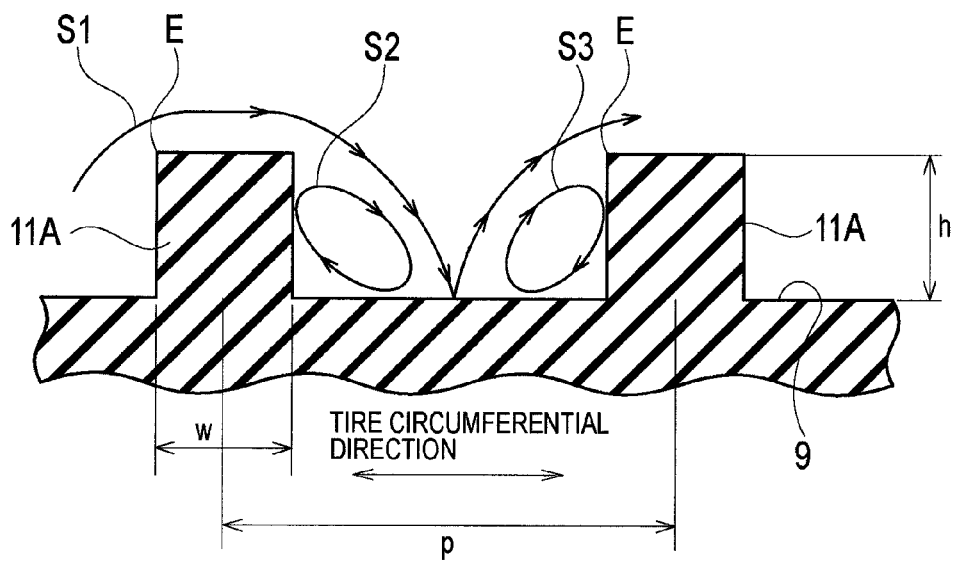
(b)
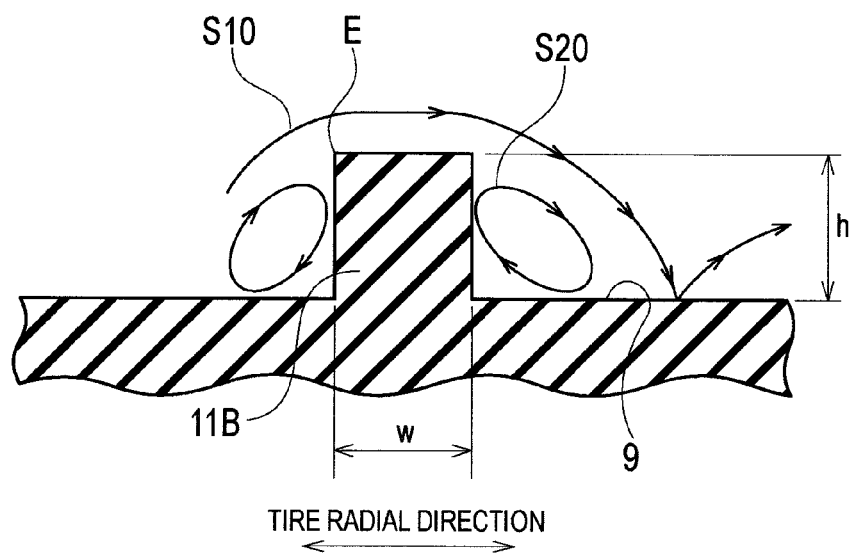

PNEUMATIC TIRE

TECHNICAL FIELD

The present invention relates to a pneumatic tire, and particularly, to a pneumatic tire provided with a turbulent flow generation projection for generating a turbulent flow at least in a portion of the tire surface.

BACKGROUND ART

In general, a rise of the tire temperature of a pneumatic tire is considered to be unfavorable from the viewpoint of durability because such rise may accelerate change over time such as deterioration of the material properties of the tire, or may cause breakage of its tread portion at the time of high speed traveling. Especially, for off-the-road radial tire (ORR) and truck/bus radial tire (TBR) for use under heavy load, and run-flat tire at the time of driving with a puncture (with 0 kPa internal pressure), reduction of the tire temperature in order to improve the durability of the tire has been a great challenge.

For example, a pneumatic tire with the following configuration has been disclosed: the tire thickness is increased outward in the tread width direction in a neighborhood of a position where a bead portion is in contact with a rim flange, and the thickened reinforced portion is formed to have such a shape as to cover the rim flange (so-called rim guard) (Japanese Patent Laid-Open No. 2006-76431). According to this configuration, the tire temperature can be reduced by suppressing deformation of the tire surface (especially bead portion) of the sidewall portion.

The conventional pneumatic tire described above, however, has the thick bead portion and the temperature thereof will be increased due to its thickness. Thus, deformation of the bead portion due to load to the tire may break the reinforced portion, and the neighborhood of the bead portion may be damaged by development of cracking caused by this breakage.

Especially, the heavy-duty tire has significant deformation when a heavy load is applied to the tire, thus, providing such reinforced portion creates concerns about the above problem. With this heavy-duty tire, even if the bead portion is not provided with the reinforced portion, the bead portion is originally formed with a greater thickness than that of the tire surface of other sidewall portions, thus the temperature of the bead portion is increased, and not only the durability of the bead portion but also the durability of the tire is reduced.

The present invention has been made in view of such background, and it is an object of the invention to provide a pneumatic tire capable of reducing the tire temperature, particularly in the neighborhood of the bead portion, thereby increasing the durability of the tire.

DISCLOSURE OF THE INVENTION

Based on the background described above, the inventors of the present application analyzed how to reduce the tire temperature efficiently. As a result, it has been found that a rise of the tire temperature, particularly in the neighborhood of the bead portion is suppressed and the heat dissipation rate of the tire temperature is improved by accelerating the speed of the rotational wind generated from the forward in the tire rotation direction as the pneumatic tire is rotated, as well as the speed of the wind generated from the front of the vehicle with traveling of the vehicle (traveling wind).

The present invention has the following features. The first feature of the present invention is summarized in that a pneumatic tire comprising at least a turbulent flow generation projection configured to generate a turbulent flow, the turbulent flow generation projection being arranged in a range from a maximum tire width position to an outside bead position, the maximum tire width position being a position on a tire surface with maximum tire width, and the outside bead position being a position on an outside of a bead portion in a tire radial direction, the bead portion configured to be in contact with a rim flange. The turbulent flow generation projection includes a radial projection extending along the tire radial direction, and a circumferential projection extending in an approximately circular arc shape along a tire circumferential direction.

According to such feature, a turbulent flow generation projection includes a radial projection and a circumferential projection. With the turbulent flow generation projection, the rotational wind flow generated from the forward in the tire rotation direction as the pneumatic tire is rotated can be accelerated by the radial projection, and the traveling wind generated from the front of the vehicle with traveling of the vehicle can be accelerated by the circumferential projection. Accordingly, the heat dissipation rate of tire temperature can be increased. Thus, the tire temperature, particularly in the neighborhood of the bead portion can be reduced by the accelerated rotational wind and traveling wind, and the durability of the tire can be increased.

The second feature of the present invention dependent from the first feature of the present invention and summarized in that the radial projection and the circumferential projection are separately provided.

The third feature of the present invention dependent from the first feature of the present invention, and summarized in that a projection width (w) which is a width of a lower side of a cross section of the turbulent flow generation projection is set to 2 to 10 mm, the cross section being taken perpendicular to an extending direction of the turbulent flow generation projection The fourth feature of the present invention dependent from the first feature of the present invention and summarized in that a projection height (h) from the tire surface to a most protruded position of the turbulent flow generation projection is set to 3 to 20 mm.

The fifth feature of the present invention dependent from the fourth feature of the present invention and summarized in that the projection height (h) is set to 7.5 to 15 mm.

The sixth feature of the present invention dependent from the first feature of the present invention and summarized in that a projection-to-rim distance (d) from an innermost position of the circumferential projection to an outermost position of the rim flange in the tire radial direction in a cross section in a tread width direction is set to 30 to 200 mm.

The seventh feature of the present invention dependent from the first feature of the present invention and summarized in that the turbulent flow generation projection is formed with an approximately quadrangular shape in a cross section approximately perpendicular to the extending direction.

The eighth feature of the present invention dependent from the first feature of the present invention and summarized in that the turbulent flow generation projection is formed with an approximately trapezoidal shape in a cross section approximately perpendicular to the extending direction.

The ninth feature of the present invention dependent from the first feature of the present invention and summarized in that the turbulent flow generation projection is formed with an approximately triangular shape in a cross section approximately perpendicular to the extending direction.

The tenth feature of the present invention dependent from the first feature of the present invention and summarized in that the turbulent flow generation projection is formed with a stepped shape having a step in a cross section approximately perpendicular to the extending direction.

The eleventh feature of the present invention dependent from the first feature of the present invention and summarized in that the turbulent flow generation projection has a through hole formed to penetrate therein in a direction approximately perpendicular to the extending direction.

The twelfth feature of the present invention dependent from the first feature of the present invention and summarized in that relationships of $1.0 \leq p/h \leq 20.0$ and $1.0 \leq (p-w)/w \leq 100.0$ are satisfied where "h" is a projection height from the tire surface to the most protruded position of the turbulent flow generation projection, "p" is a pitch between adjacent turbulent flow generation projections, and "w" is the projection width.

The thirteenth feature of the present invention dependent from the first feature of the present invention and summarized in that a projection-to-radial direction inclined angle ($\theta 1$), which is an inclined angle of the radial projection to the tire radial direction, satisfies a range of $-30° \leq \theta 1 \leq 30°$.

The fourteenth feature of the present invention dependent from the first feature of the present invention and summarized in that a projection-to-circumferential direction inclined angle ($\theta 2$), which is an inclined angle of the circumferential projection to the tire circumferential direction satisfies a range of $-20° \leq \theta 2 \leq 20°$.

The fifteenth feature of the present invention dependent from the first feature of the present invention and summarized in that the pneumatic tire according to claim 1, wherein a relationship of $1.0 \leq h/w \leq 10.0$ is satisfied where "h" is a projection height from the tire surface to the most protruded position of the turbulent flow generation projection, and "w" is a width of a lower side of a cross section approximately perpendicular to the extending direction of the turbulent flow generation projection.

The sixteenth feature of the present invention dependent from the first feature of the present invention and summarized in that the pneumatic tire is a heavy-duty tire.

ADVANTAGES OF THE INVENTION

According to the present invention, it is possible to provide a pneumatic tire capable of reducing the tire temperature, particularly in the neighborhood of the bead portion, as well as increasing the durability of the tire.

BRIEF DESCRIPTION OF THE DRAWINGS

FIG. 5 is an enlarged side view showing a radial projection 11A and a circumferential projection 11B according to the present embodiment.

FIG. 16 is a view for showing the operations and effects of a turbulent flow generation projection according to the present embodiment.

BEST MODE FOR CARRYING OUT THE INVENTION

Figure 1:
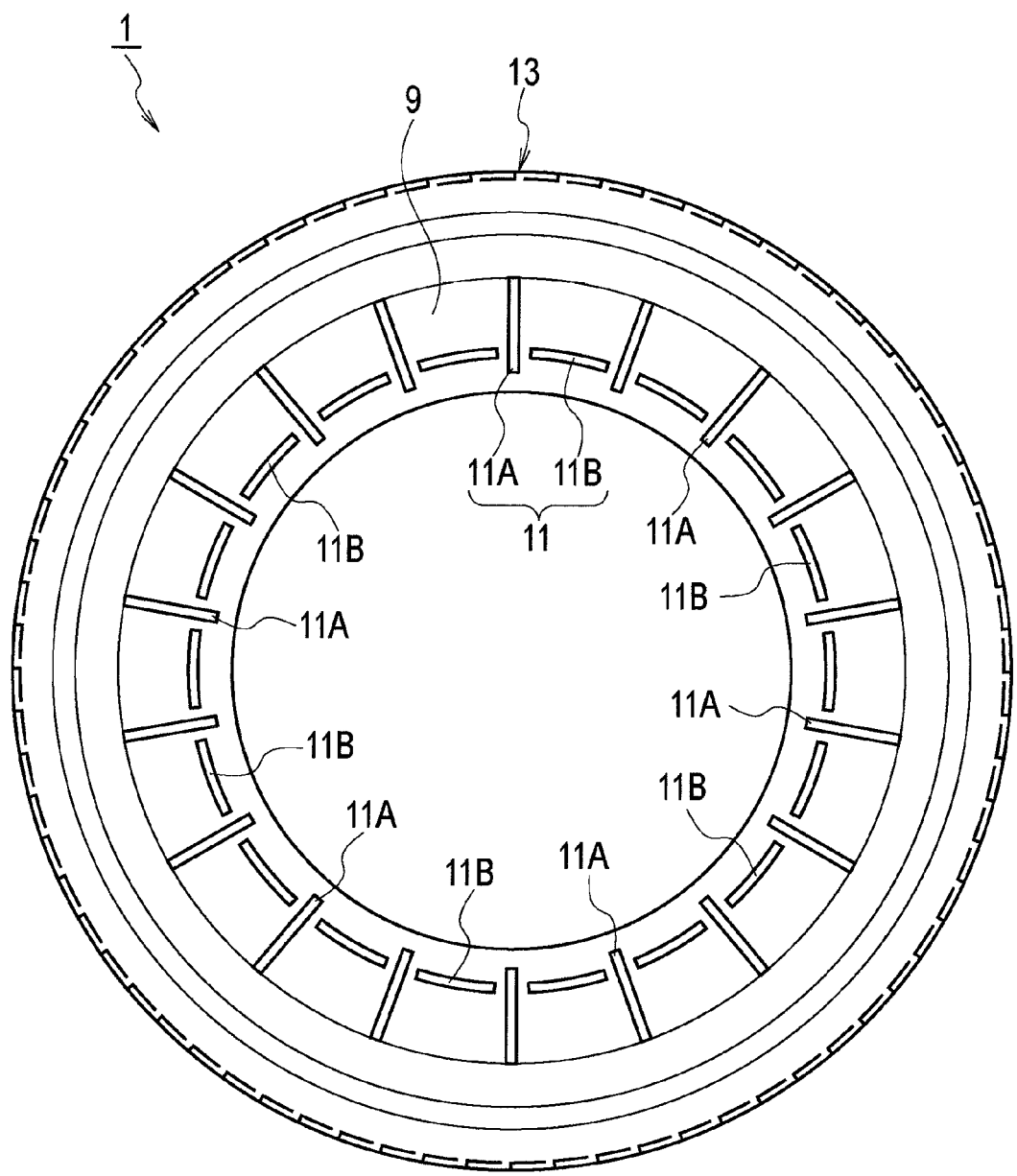
FIG. 1 is a side view showing a pneumatic tire 1 according to the present embodiment.

Now, an example of a pneumatic tire according to the present invention is described with reference to the drawings. Specifically, the following are described: (1) the configuration of the pneumatic tire, (2) the configuration of the turbulent flow generation projection, (3) modifications of the turbulent flow generation projection, (4) comparative evaluation, (5) operations and effects, and (6) other embodiments.

In the following description of the drawings, identical or similar reference numerals are assigned to identical or similar components. However, the drawings are schematic and it should be noted that the dimensions are different from actual ones. Accordingly, specific dimensions should be recognized in consideration of the following description. Also, there are included some portions of the drawings between which a dimensional relationship and/or dimensional proportions are inconsistent.

(1) The Configuration of the Pneumatic Tire

Figure 2:
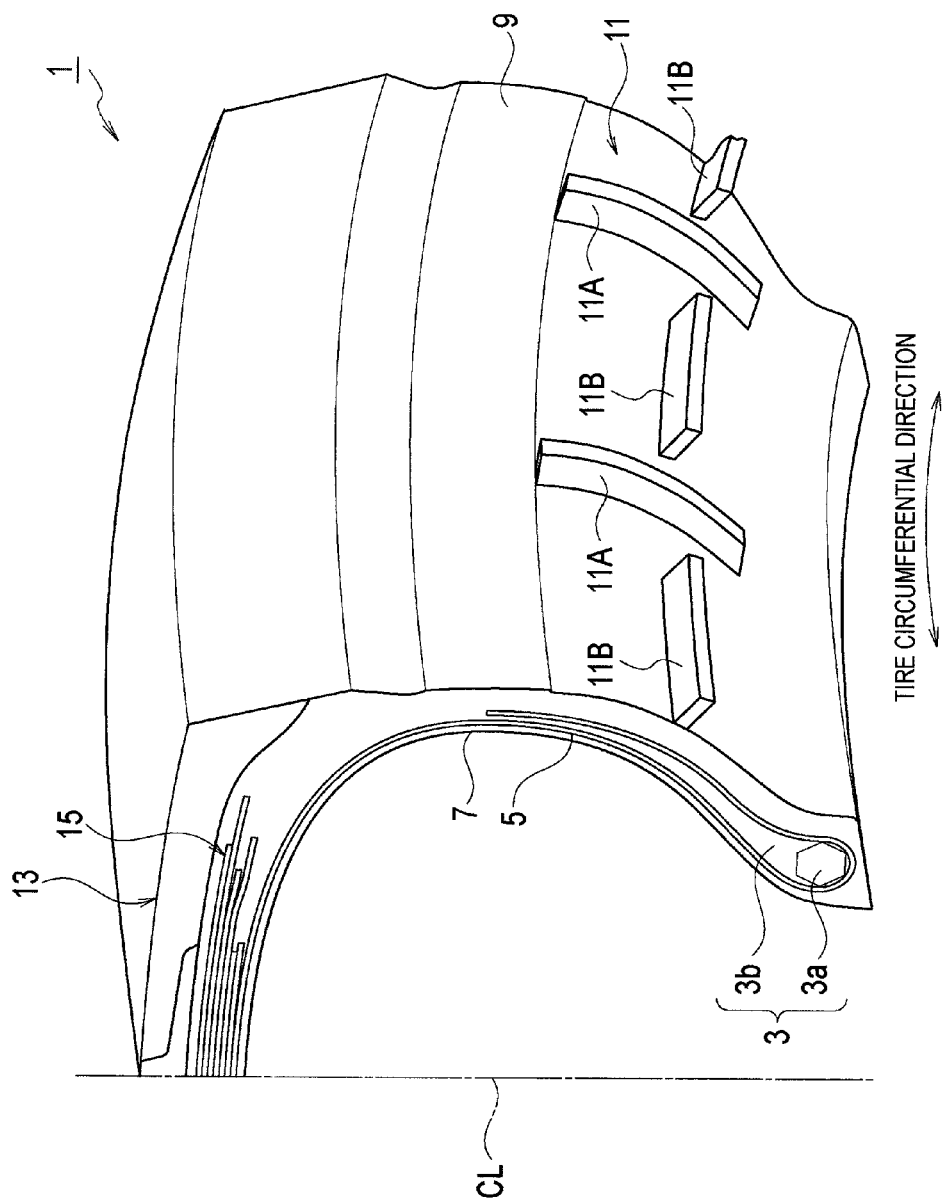
FIG. 2 is a partial sectional perspective view showing the pneumatic tire 1 according to the present embodiment.
Figure 3:
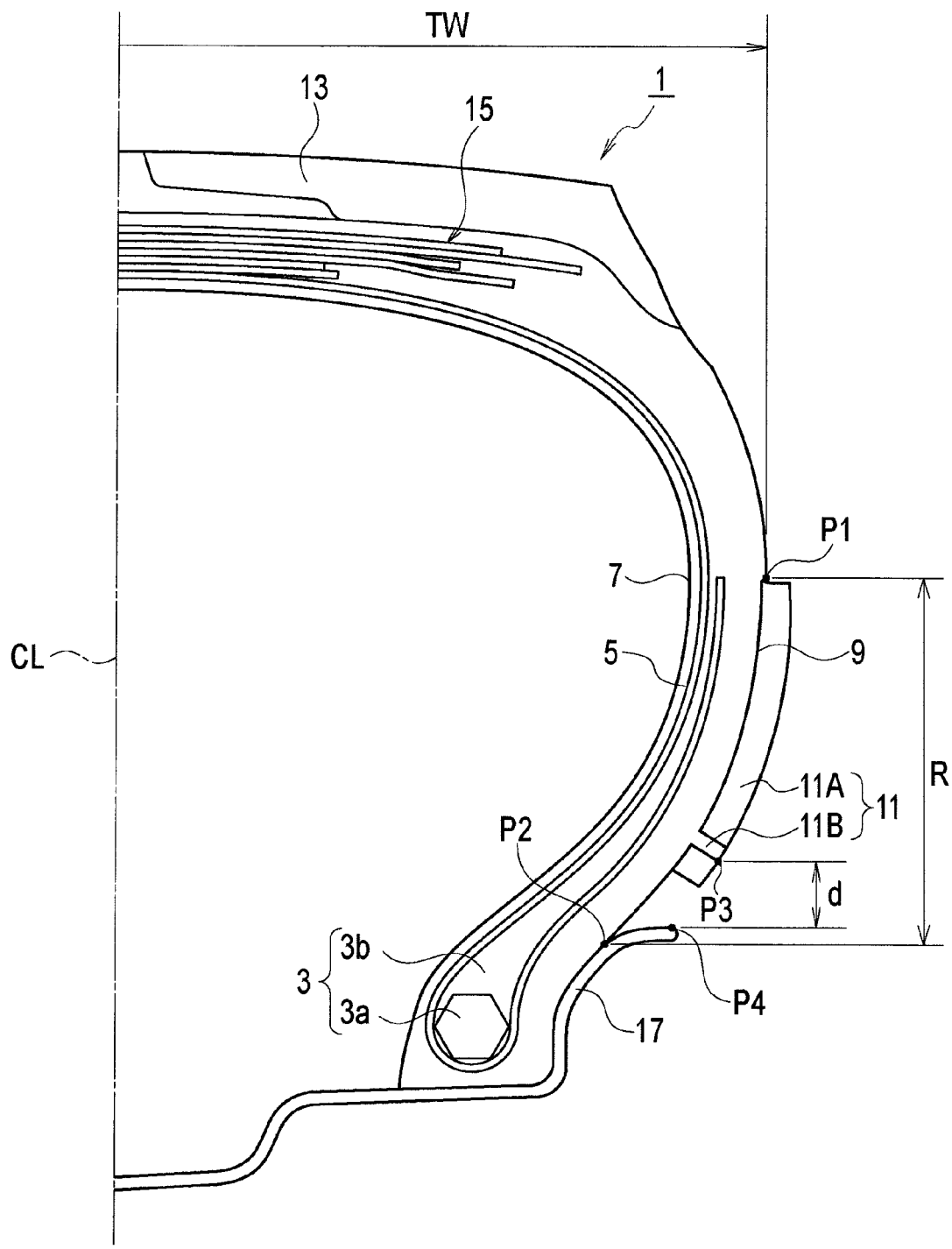
FIG. 3 is a cross-sectional view in a tread width direction showing the pneumatic tire 1 according to the present embodiment.

At first, the configuration of the pneumatic tire 1 according to the present embodiment is described with reference to FIGS. 1 to 3. FIG. 1 is a side view showing the pneumatic tire 1 according to the present embodiment. FIG. 2 is a partial sectional perspective view showing the pneumatic tire 1 according to the present embodiment. FIG. 3 is a cross-sectional view in tread width direction showing the pneumatic tire 1 according to the present embodiment. Note that the pneumatic tire 1 according to the present embodiment is assumed to be a heavy-duty tire.

As shown in FIGS. 1 to 3, the pneumatic tire 1 includes paired bead portion 3 each having at least a bead core 3a and a bead filler 3b, and a carcass layer 5 folded back at the bead core 3a.

On the inner side of the carcass layer 5, an inner liner 7, which is a highly airtight rubber layer equivalent to a tube, is provided. Also, on the outer side in the tread width direction of the carcass layer 5, i.e., a tire surface 9 in a sidewall portion (tire side surface), there is provided a turbulent flow generation projection 11 which projects from the tire surface 9 outward in the tread width direction to generate a turbulent flow.

It is assumed that the tire surface includes the tire outer surface (for example, outer surfaces of a tread portion and a sidewall portion) and the tire inner surface (for example, the inner surface of the inner liner).

A tread portion 13, which is to be in contact with a road surface, is provided on the outside in the tire radial direction of the carcass layer 5. Multiple belt layers 15 which reinforce the tread portion 13 are provided between the carcass layer 5 and the tread portion 13.

(2) The Configuration of the Turbulent Flow Generation Projection

Figure 4:
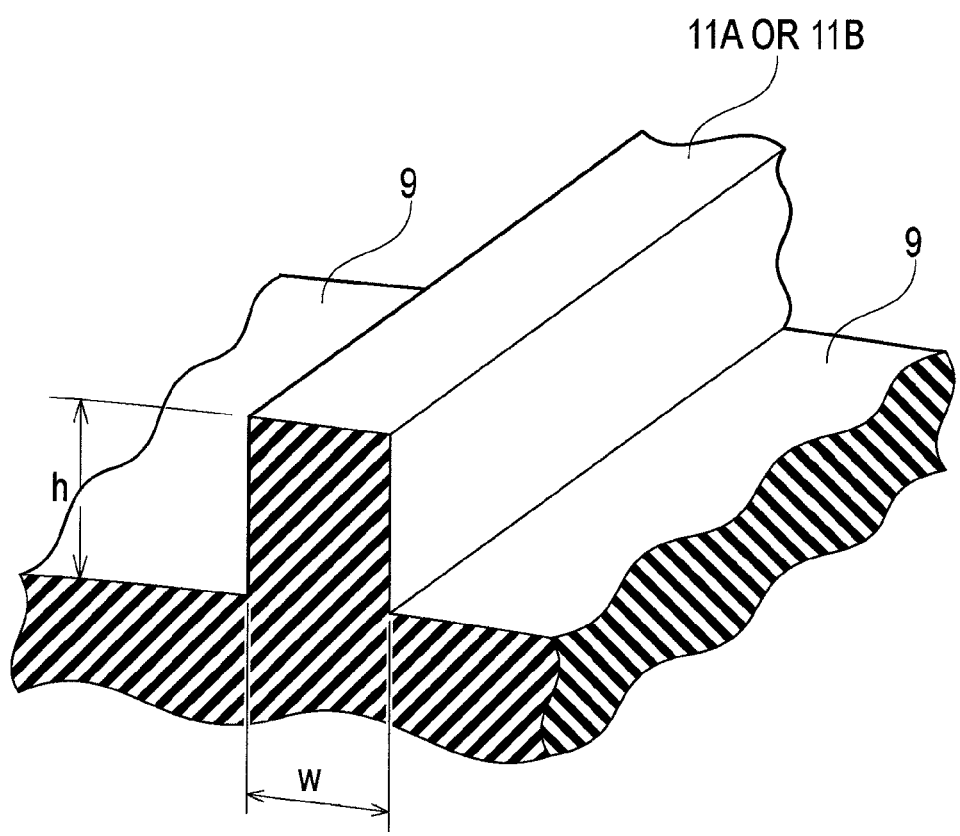
FIG. 4 is a perspective view showing a turbulent flow generation projection 11 according to the present embodiment.

Next, the configuration of the turbulent flow generation projection 11 is described with reference to FIGS. 3 to 5. FIG. 4 is a perspective view showing the turbulent flow generation projection 11 according to the present embodiment. FIG. 5 (*a*) is an enlarged side view showing a radial projection 11A according to the present embodiment. FIG. 5 (*b*) is an enlarged side view showing a circumferential projection 11B according to the present embodiment.

As shown in FIG. 3, the turbulent flow generation projection 11 is provided in a range R from a maximum tire width position P1 to an outside bead position P2 where P1 is the position on the tire surface 9 with maximum tire width TW, and P2 is the position on the outside of the bead portion 3 in the tire radial direction, being in contact with the rim flange 17.

Specifically, the turbulent flow generation projection 11 includes multiple radial projections 11A, which continuously linearly extend along the tire radial direction (i.e., the radial direction), and multiple circumferential projections 11B, which are arranged in one row in the tire radial direction, and extend in an approximately circular arc shape along the tire circumferential direction (i.e., the tire rotation direction).

The radial projection 11A and the circumferential projection 11B are separately provided. Also, the turbulent flow generation projections 11 (the radial projection 11A and the circumferential projection 11B) are formed with an approximately quadrangular shape in the cross section approximately perpendicular to the extending direction.

As shown in FIG. 3, a projection-to-rim distance (d) from P3 to P4 in the cross section in the tread width direction is preferably is set to 30 to 200 mm where P3 is the innermost position of the circumferential projection 11B and P4 is the outermost position of the rim flange 17 in the tire radial direction.

If the projection-to-rim distance (d) is less than 30 mm, the turbulent flow generation projection 11 may be cut away due to possible contact with rim flange 17, thus the durability of the turbulent flow generation projection 11 may be reduced. On the other hand, if the projection-to-rim distance (d) is greater than 200 mm, the distance is not sufficiently small to reduce the temperature in the neighborhood of the bead portion 3 which is originally formed thicker than the tire surface 9 in other sidewall portions, thus the tire temperature may not be efficiently reduced.

As shown in FIG. 4, a projection width (w) which is the width of the lower side of the cross section of the turbulent flow generation projections 11 (the radial projection 11A and the circumferential projection 11B) is set to 2 to 10 mm, the cross section being taken in approximately perpendicular to the extending direction of the turbulent flow generation projections 11.

If the projection width (w) is less than 2 mm, the strength of the turbulent flow generation projection 11 may be too small, causing vibration of the turbulent flow generation projection 11 due to rotational wind or traveling wind, thus the durability of the turbulent flow generation projection 11 may be reduced. On the other hand, if the projection width (w) is greater than 10 mm, the width is not sufficiently small to reduce the temperature within the turbulent flow generation projection 11 (heat storage temperature), thus the tire temperature may not be efficiently reduced.

A projection height (h) from the tire surface 9 to the most protruded position of the turbulent flow generation projection 11 is set to 3 to 20 mm. In particular, the projection height (h) is preferably set to 7.5 to 15 mm.

If the projection height (h) is less than 3 mm, the height is not sufficient to accelerate a flow of rotational wind or traveling wind which flows over the turbulent flow generation projection 11, thus the tire temperature may not be efficiently reduced. On the other hand, if the projection height (h) is greater than 20 mm, the height is not sufficiently small to reduce the temperature within the turbulent flow generation projection (heat storage temperature), and also the strength of the turbulent flow generation projection 11 may be too small, thus the above-mentioned problem may occur.

It is preferable to satisfy the relationships of $1.0 \leq p/h \leq 20.0$ and $1.0 \leq (p-w)/w \leq 100.0$ where "h" is the above-mentioned projection height, "p" is the pitch between adjacent turbulent flow generation projections 11, and "w" is the projection width.

In particular, it is preferable to set the relationship of $2.0 \leq p/h \leq 15.0$, and is further preferable to set the relationship of $4.0 \leq p/h \leq 10.0$. In addition, it is preferable to set the relationship of $5.0 \leq (p-w)/w \leq 70.0$, and is further preferable to set the relationship of $10.0 \leq (p-w)/w \leq 30.0$. Note that the pitch (p) is the distance between the midpoints of the width of adjacent turbulent flow generation projections 11 in their extending direction.

As described above, if the pitch (p) is too small, i.e., the pitch (P) is narrow, rotational wind or traveling wind (turbulent flow) does not come into the tire surface 9 (groove base portion) between the turbulent flow generation projections 11, while if the pitch (p) is too large, the resulting performance will be equivalent to the one with no shaping of the turbulent flow generation projections 11. Thus, it is preferable that the pitch "p" be set to satisfy the above-mentioned numerical value ranges.

The value (p−w)/w shows the ratio of the pitch (p) to the projection width, and too small value of the ratio means that the ratio of the area of the surface whose heat needs to be dissipated to the surface area of the turbulent flow generation projection 11 becomes equivalent. The turbulent flow generation projection 11 is made of rubber, and so an improvement of heat dissipation effect due to an increase of the surface area can not be expected, thus the minimum value of (p−w)/w is defined to be 1.0.

Also, for the turbulent flow generation projection 11, it is preferable to satisfy the relationship of $1.0 \leq h/w \leq 10$ where "h" is the above-mentioned projection height, and "w" is the above-mentioned projection width.

If the value of the ratio (h/w) of the projection height (h) to the projection width (w) is less than 1.0, the value is not sufficient to accelerate the rotational wind or traveling wind which flows over the turbulent flow generation projection 11, thus the tire temperature, particularly the temperature in the neighborhood of the bead portion 3 may not be efficiently reduced. On the other hand, if the value of the ratio (h/w) of the projection height (h) to the projection width (w) is greater than 10, the value is not sufficiently small to reduce the temperature within the turbulent flow generation projection 11 (heat storage temperature), thus the tire temperature may not be efficiently reduced.

As shown in FIG. 5(a), the projection-to-radial direction inclined angle ($\theta 1$), which is the inclined angle of the radial projection 11A to the tire radial direction, preferably satisfies the range of $-30° \leq \theta 1 \leq 30°$. When the pneumatic tire 1 rotates, the rotational wind or traveling wind on the tire surface 9 of the sidewall portion flows outward in the radial direction due to the centrifugal force of the tire. In order to reduce the portion of stagnant air on the back face side of the projections for an inflow of air between adjacent turbulent flow generation projections 11, the projection-to-radial direction inclined angle ($\theta 1$) is preferably set in the above-mentioned range.

The projection-to-radial direction inclined angle ($\theta 1$) is not necessarily needed to be set to a same value for all the radial projections 11A. As long as the projection-to-radial direction inclined angle ($\theta 1$) is in the above-mentioned range, each projection-to-radial direction inclined angle ($\theta 1$) may have a different value, and each projection may have different inclined direction.

As shown in FIG. 5(b), the projection-to-circumferential direction inclined angle ($\theta 2$), which is the inclined angle of the circumferential projection 11B to the tire circumferential direction, preferably satisfies the range of $-20° \leq \theta 2 \leq 20°$. As a vehicle travels, the traveling wind generated from the front side of the vehicle blows against the turbulent flow generation projection 11 from a direction inclined to the surface of the projection. Thus, if the angle range of the projection-to-circumferential direction inclined angle ($\theta 2$) is out of the above-mentioned range, the absolute value of the angle is not sufficiently small to accelerate the traveling wind which flows over the turbulent flow generation projection 11, compared with the case where the traveling wind blows approximately perpendicular to the turbulent flow generation projection 11, thus the tire temperature may not be efficiently reduced.

(3) Modifications of the Turbulent Flow Generation Projection

The turbulent flow generation projection 11 according to the embodiment described above may be modified as follows. The same components as those of the pneumatic tire 1 according to the embodiment described above are shown with the same reference numerals as used in the embodiment, and different components from those of the pneumatic tire 1 according to the embodiment are mainly described.

(3-1) Modification 1

Figure 6:
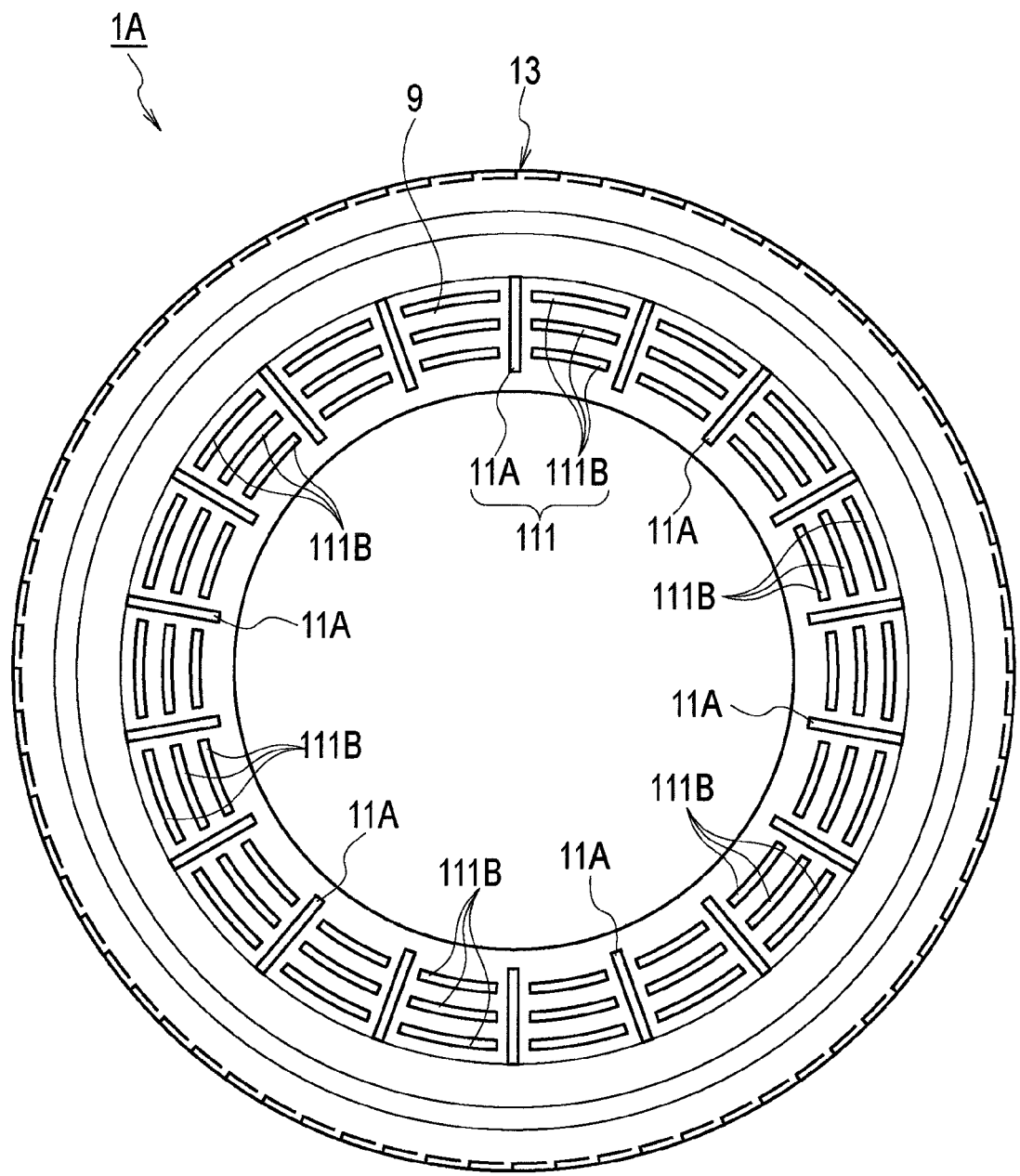
FIG. 6 is a side view showing a pneumatic tire 1A according to Modification 1.

At first, a turbulent flow generation projection 111 according to Modification 1 is described with reference to FIG. 6. FIG. 6 is a side view showing a pneumatic tire 1A according to Modification 1.

The circumferential projections 11B according to the embodiment described above are arranged in one row in the tire radial direction. On the other hand, circumferential projections 111B according to Modification 1 are arranged in three rows in the tire radial direction, and extend in an approximately circular arc shape along the tire circumferential direction as shown in FIG. 6. It should be noted that the circumferential projections 111B are not necessarily needed to be arranged in three rows, and may be arranged in multiple rows.

(3-2) Modification 2

Figure 7:
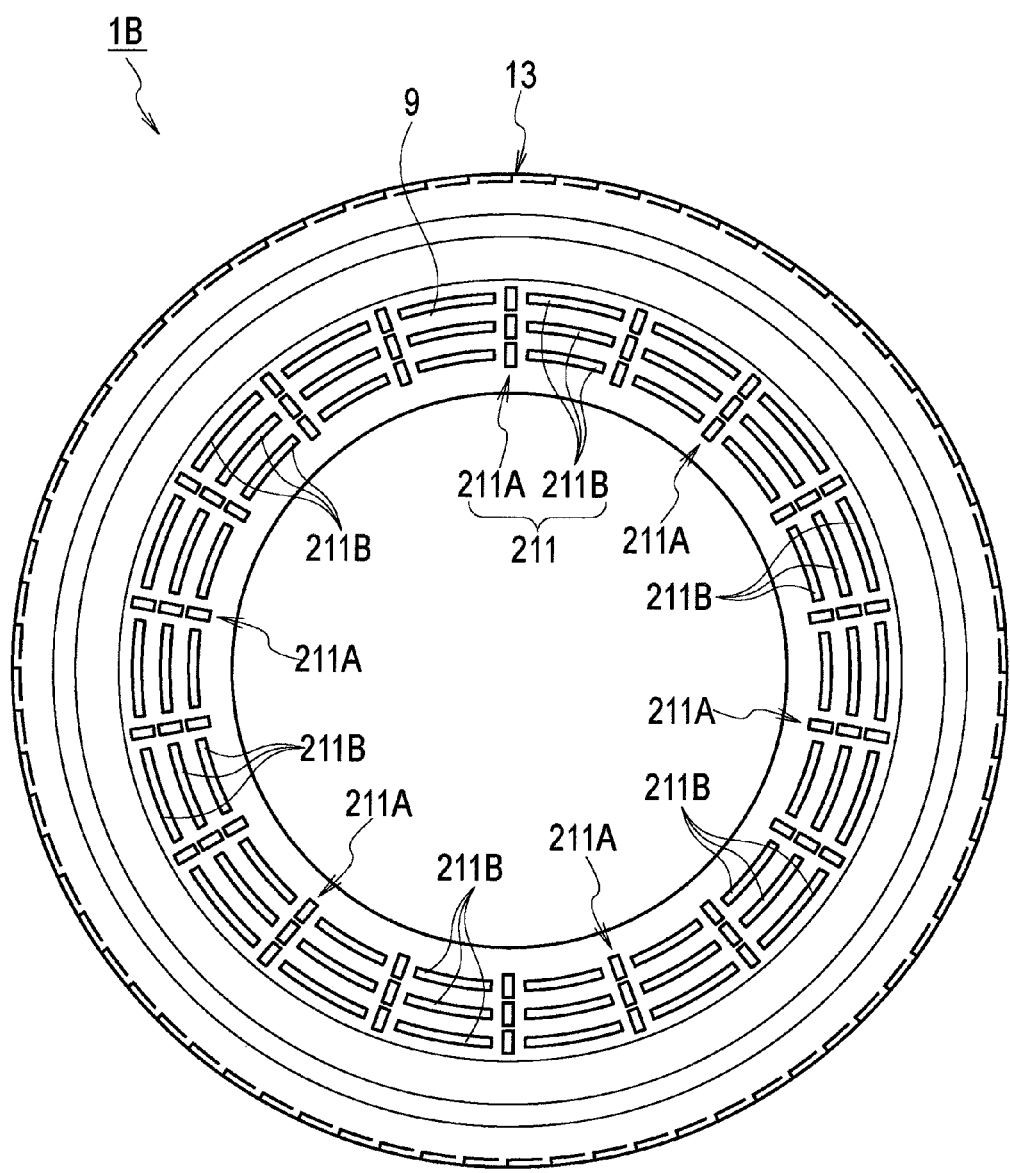
FIG. 7 is a side view showing a pneumatic tire 1B according to Modification 2.

Next, a turbulent flow generation projection 211 according to Modification 2 is described with reference to FIG. 7. FIG. 7 is a side view showing a pneumatic tire 1B according to Modification 1.

The radial projection 11A according to the embodiment described above continuously linearly extends along the tire radial direction. On the other hand, a radial projection 211A according to Modification 2 extends along the tire radial direction as shown in FIG. 7.

The radial projection 211A is provided by multiple separate portions (three separate portions in FIG. 7) of the projection in the tire radial direction. It should be noted that the radial projections 211A are not necessarily needed to be separated into a same number of portions, but may be separated into a different number of portions.

Circumferential projections 211B are arranged in three rows in the tire radial direction, and extend in an approximately circular arc shape along the tire circumferential direction. It should be noted that the circumferential projections 211B are not necessarily needed to be arranged in three rows, and may be arranged in one row as the embodiment described above, or arranged in multiple rows.

(3-3) Modification 3

Figure 8:
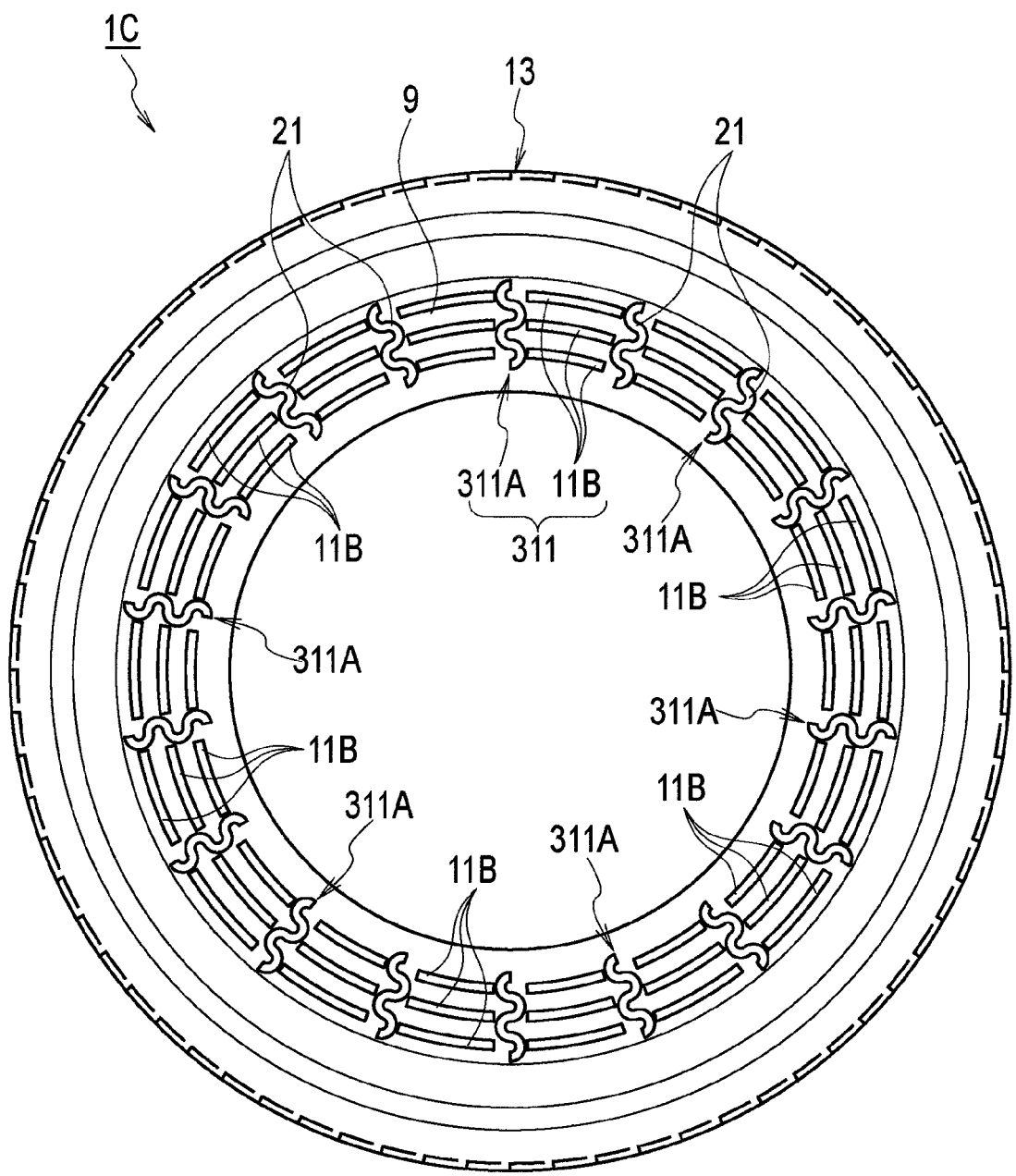
FIG. 8 is a side view showing a pneumatic tire 1C according to Modification 3 (first).

Next, a turbulent flow generation projection 311 according to Modification 3 is described with reference to FIG. 8. FIG. 8 is a side view showing a pneumatic tire 1C according to Modification 3.

The radial projection 11A according to the embodiment described above linearly extends along the tire radial direction. On the other hand, a radial projection 311A according to Modification 3 has curved portions 21 which are inflected at equal intervals in a curved shape while extending along the tire radial direction as shown in FIG. 8. The radial projection 311A has multiple curved portions 21 where the radial projection 311A is alternately inclined to the tire radial direction.

Figure 9:
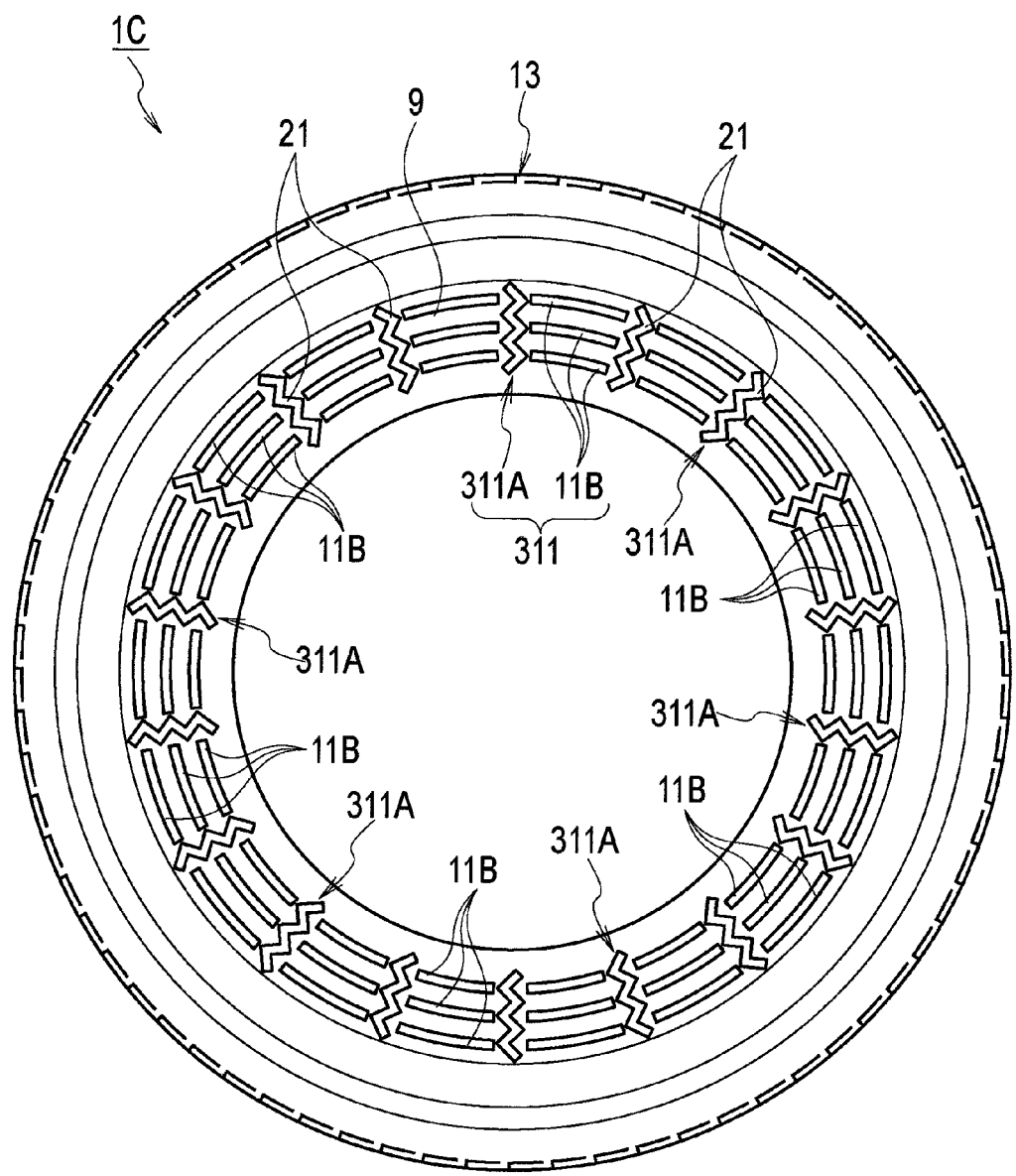
FIG. 9 is a side view showing a pneumatic tire 1C according to Modification 3 (second).

It should be noted that the radial projection 11A is not necessarily needed to be inflected in a curved shape while extending along the tire radial direction, and may be inflected linearly while extending along the tire radial direction as shown in FIG. 9.

(3-4) Modification 4

Next, a turbulent flow generation projection 411 according to Modification 4 is described with reference to FIGS. 10 to 13. FIGS. 10 to 13 are cross-sectional views perpendicular to the extending direction showing the turbulent flow generation projection 411 according to Modification 4.

Figure 10:
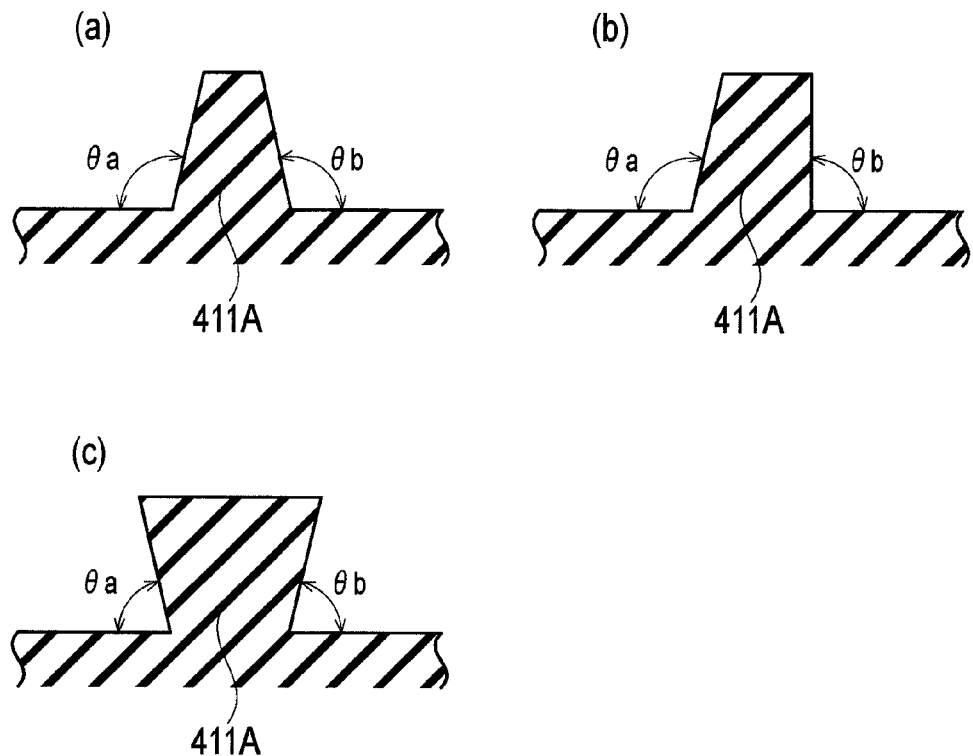
FIG. 10 is a cross-sectional view perpendicular to an extending direction showing a turbulent flow generation projection 411 according to Modification 4 (first).

The turbulent flow generation projection 11 according to the embodiment described above is formed with an approximately quadrangular shape in the cross section approximately perpendicular to the extending direction. On the other hand, a turbulent flow generation projection 411A may be formed with an approximately trapezoidal shape in the cross section approximately perpendicular to the extending direction as shown in FIGS. 10 (a) to 10 (c) in order to prevent crack formation due to wear of the corners of the projection. Note that in the cross section, the inclined angle ($\theta$a) between the tire surface 9 and one lateral side of the turbulent flow generation projection 411A is not required to be the same as the inclined angle (θb) between the tire surface 9 and the other lateral side of the turbulent flow generation projection 411A.

Figure 11:
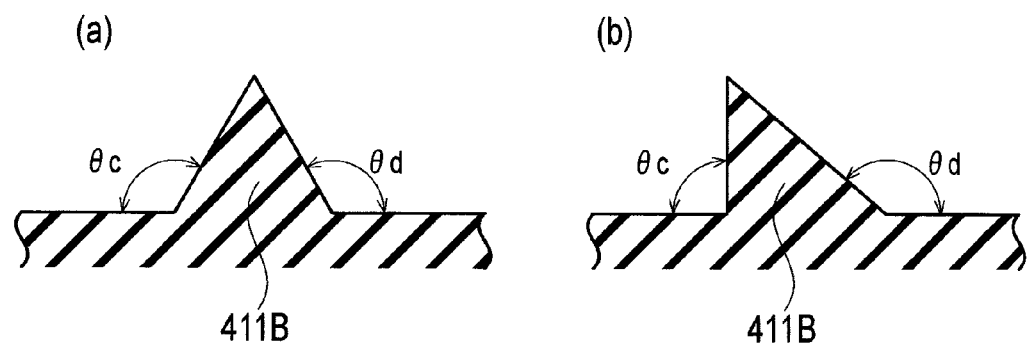
FIG. 11 is a cross-sectional view perpendicular to an extending direction showing a turbulent flow generation projection 411 according to Modification 4 (second).

As shown in FIGS. 11 (a) and 11 (b), a turbulent flow generation projection 411B may be formed with an approximately triangular shape in the cross section approximately perpendicular to the extending direction in order to reduce the amount of rubber used while maintaining the dimension and the rigidity of the lower side of the projection compared with the case of the projection having the approximately quadrangular shape in the cross section. Note that in the cross section, the inclined angle (θc) between the tire surface 9 and one lateral side of the turbulent flow generation projection 411B is not required to be the same as the inclined angle (θd) between the tire surface 9 and the other lateral side of the turbulent flow generation projection 411B.

Figure 12:
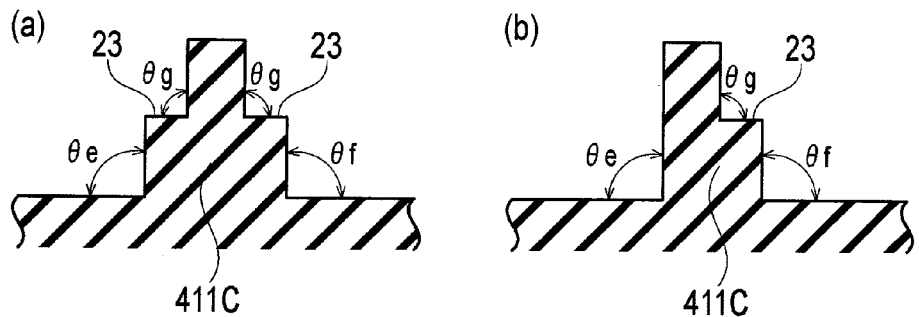
FIG. 12 is a cross-sectional view perpendicular to an extending direction showing a turbulent flow generation projection 411 according to Modification 4 (third).
Figure 13:
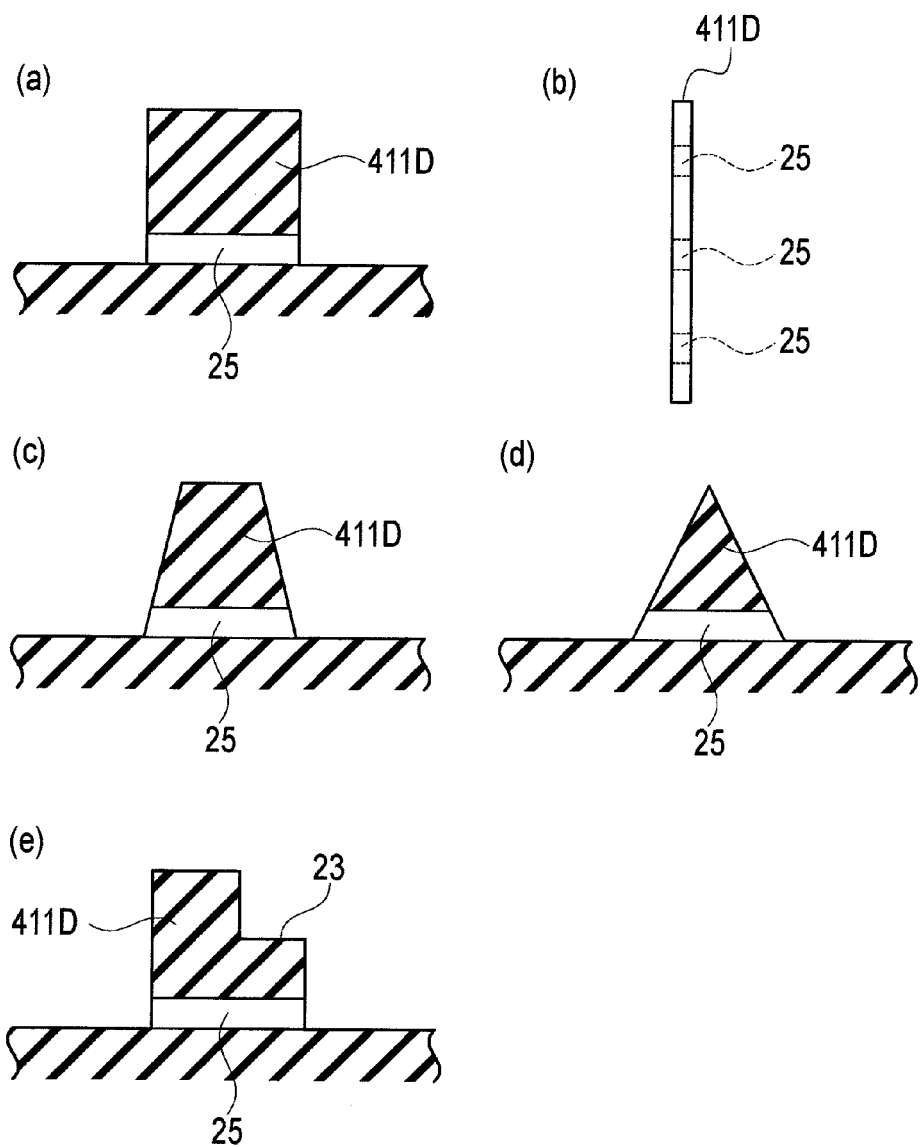
FIG. 13 is a cross-sectional view perpendicular to an extending direction showing a turbulent flow generation projection 411 according to Modification 4 (fourth).

As shown in FIGS. 12 (a) and 12 (b), a turbulent flow generation projection 411C may be formed with a stepped shape having a step 23 in the cross section approximately perpendicular to the extending direction in order to reduce the amount of rubber used while maintaining the dimension and the rigidity of the lower side of the projection similarly to the case of the projection having the approximately triangular shape in the cross section. In this case, the step 23 may be provided on the both lateral sides of the turbulent flow generation projection 411C as shown in FIG. 12(a), or may be provided on either lateral side of the turbulent flow generation projection 411C as shown in FIG. 12(b). Note that in the cross section, the inclined angle (θc) between the tire surface 9 and one lateral side of the turbulent flow generation projection 411B, and the inclined angle (θd) between the tire surface 9 and the other lateral side of the turbulent flow generation projection 411B are not required to be the same, and not required to be right angles. It should be noted that an intersecting angle (θg) between one side and the other side of the step 23 is not limited to an approximately right angle, but may be slanted angle.

Further, as shown in FIGS. 13(a) and 13(b), a turbulent flow generation projection 411D may be formed with an approximately quadrangular shape in a cross section approximately perpendicular to the extending direction, and multiple through holes 25 penetrating in an approximately perpendicular direction to the extending direction may be formed in the turbulent flow generation projection 411D in order to increase the heat dissipation rate of the turbulent flow generation projection 11 itself.

Note that the turbulent flow generation projection 411D with the through holes 25 formed therein does not necessarily need to have an approximately quadrangular shape in the cross section approximately perpendicular to the extending direction, but may have, for example, an approximately trapezoidal shape in the cross section as shown in FIG. 13(c), an approximately triangular shape in the cross section as shown in FIG. 13(d), or a stepped shape having the step 23 in the cross section as shown in FIG. 13(e).

(4) Comparative Evaluation

Next, in order to further clarify the effects of the present invention, the results of tests performed using the pneumatic tire according to the following comparative examples 1 to 3 and the embodiment are described. The present invention is not limited to these examples by any means.

The configuration and temperature rise tests for the bead portion of the pneumatic tire according to the following comparative examples 1 to 3 and the embodiment are described with reference to Table 1. The temperature rise tests for the bead portion were performed under the conditions of the tire size of 53/80R63, a normal internal pressure, and a normal load (conditions for tire for construction vehicle).

TABLE 1

|  |  | Comparative example 1 | Comparative example 2 | Comparative example 3 | Embodiment |
| --- | --- | --- | --- | --- | --- |
| Radial projection | projection height h | — | 15 mm | — | 15 mm |
|  | p/h (*1) | — | 6 | — | 6 |
|  | width of lower side of projection | — | 6 mm | — | 6 mm |
|  | width of upper side of projection | — | 4 mm | — | 4 mm |
|  | projection-to-radial direction inclined angle θ1 | — | 0° C. | — | 0° C. |
| Circumferential projection | projection height h | — | — | 12 mm | 12 mm |
|  | p/h | — | — | 6 | 6 |
|  | width of lower side of projection | — | — | 6 mm | 6 mm |
|  | width of upper side of projection | — | — | 4 mm | 4 mm |
|  | distance d from flange | — | — | 150 mm | 150 mm |
|  | projection-to-circumferential direction inclined angle θ2 | — | — | 0° C. | 0° C. |
| Temperature rise tests for bead portion |  | 30° C. to 80° C. (50° C. rise) | 30° C. to 73° C. (43° C. rise) | 30° C. to 74° C. (44° C. rise) | 30° C. to 70° C. (40° C. rise) |

(*1) p/h of the radial projection is measured at a position with distance d = 200 mm from the flange As shown in Table 1, the pneumatic tire according to Comparative Example 1 is not provided with a turbulent flow generation projection. The pneumatic tire according to Comparative Example 2 is provided with the radial projections, but not provided with a circumferential projection. The pneumatic tire according to Comparative Example 3 is not provided with a radial projection, but provided with the circumferential projections. The pneumatic tire according to the embodiment is provided with the radial projections 11A and the circumferential projections 11B (see FIGS. 1 to 3).

<Temperature Rise Tests for Bead Portion>

Each pneumatic tire installed on a normal rim was mounted on the front wheel of a 320-ton dump truck under the above-mentioned conditions. After the dump truck was driven for 24 hours at 15 km/h, a temperature rise was measured at the location approximately 20 mm above the rim flange and approximately 5 mm outer side in the tread width direction of the carcass layer. The temperature shown is the average of measured values at six positions equally spaced along the tire circumferential direction.

As a result, it was demonstrated that the pneumatic tire 1 according to the embodiment had a smaller temperature rise of the bead portion compared with the pneumatic tire according to Comparative Examples 1 to 3, thus the temperature in the neighborhood of the bead portion can be reduced. It was demonstrated that, because of the radial projections 11A and the circumferential projections 11B provided to the pneumatic tire 1 according to the embodiment, the tire temperature, particularly in the neighborhood of the bead portion can be reduced.

<Durability Test>

Figure 14:
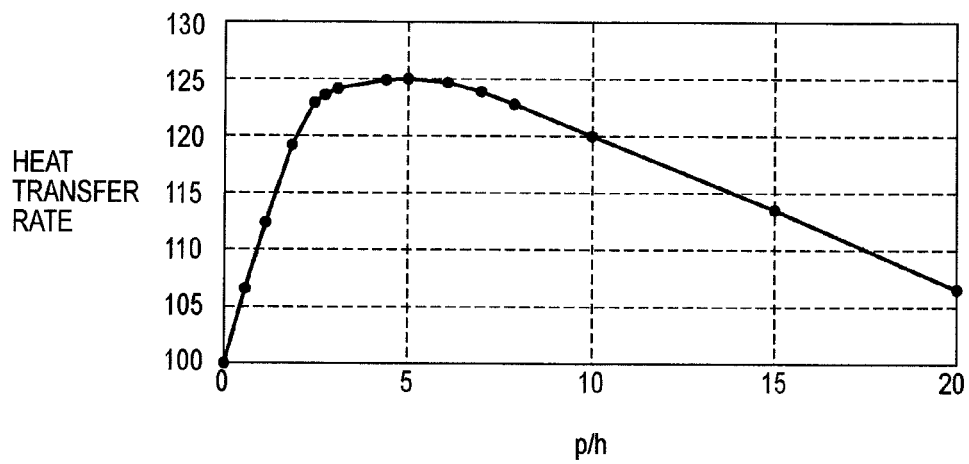
FIG. 14 is a graph showing the heat transfer rate of a pneumatic tire for comparative evaluation (first).
Figure 15:
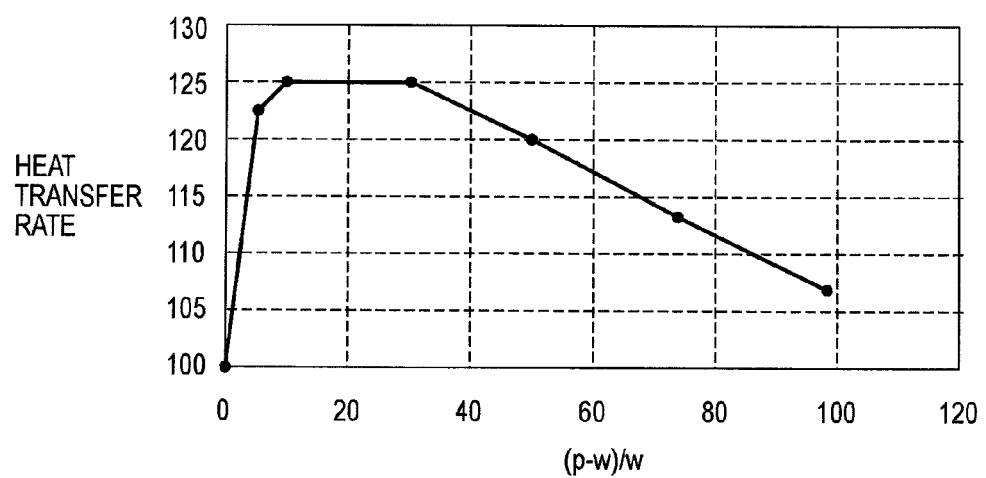
FIG. 15 is a graph showing the heat transfer rate of a pneumatic tire for comparative evaluation (second).

Next, the durability test results obtained by using varied p/h and (p−w)/w for the turbulent flow generation projection are shown in FIGS. 14 and 15. The ordinate axis of the graphs of FIGS. 14 and 15 indicates the heat transfer rate determined by measuring the temperature on the tire surface and the wind speed with a blower blowing the air with a certain amount of heat generated by applying a constant voltage to a heater onto the tire. The higher the heat transfer rate is, the greater the cooling effect is, providing an excellent durability. In the durability test, the heat transfer rate of the pneumatic tire provided with no turbulent flow generation projection (conventional tire) is assumed to be "100."

The heat transfer rate measurement test was performed under the following conditions (conditions for tire for construction vehicle).

Tire size: 53/80R63
Wheel size: 36.00/5.0
Internal pressure condition: 600 kPa
Load condition: 83.6 t
Speed condition: 20 km/h As shown in FIG. 14, in the relationship between the value of ratio (p/h) of the pitch (p) to the height (h) of the turbulent flow generation projection and durability performance, by setting p/h in the range of not less than 1.0 and not more than 20.0, the heat transfer rate is increased. By setting p/h in the range of 2.0 to 15.0, better heat transfer rate and higher durability is achieved. Thus, p/h should be set in the range of $1.0 \leq p/h \leq 20.0$. Particularly, it is preferable to set p/h in the range of $2.0 \leq p/h \leq 15.0$, and further preferable to set p/h in the range of $4.0 \leq p/h \leq 10.0$.

As shown in FIG. 15, in the relationship between (p−w)/w and the heat transfer rate (measured by a similar method), by setting (p−w)/w in the range of $1.0 \leq (p-w)/w \leq 100.0$, the heat transfer rate is increased. Particularly, it is preferable to set (p−w)/w in the range of $5.0 \leq (p-w)/w \leq 70.0$, and further preferable to set (p−w)/w in the range of $10.0 \leq (p-w)/w \leq 30.0$.

(5) Operation and Effect

In the pneumatic tire 1 according to the embodiment described above, the turbulent flow generation projection 11 includes the radial projection 11A and the circumferential projection 11B. According to the embodiment, rotational wind flow generated from the forward in the tire rotation direction with the rotation of the pneumatic tire 1 can be accelerated by the multiple radial projections 11A, and traveling wind generated from the front of the vehicle with traveling of the vehicle can be accelerated by the multiple circumferential projections 11B. Accordingly, the heat dissipation rate of the tire temperature can be increased. Thus, the tire temperature, particularly in the neighborhood of the bead portion can be reduced by the accelerated rotational wind and traveling wind, and the durability of the tire can be increased.

Specifically, as shown in FIG. 16(a), a rotational wind S1 is separated from the tire surface 9 by the radial projection 11A to flow over the edge portion E of the front side of the radial projection 11A, then is accelerated to the back face side (rear side) of the radial projection 11A.

Then accelerated rotational wind S1 flows to the tire surface 9 in the vertical direction on the back face side of the radial projection 11A (so-called downward flow). At this point, a fluid S2 flowing within stagnant portion (region) of the rotational wind S1 absorbs the stagnant heat on the back face side of the radial projection 11A, and flows again into the rotational wind S1, which flows over the edge portion E of the next radial projection 11A and is accelerated.

Further, in the front side (front face side) of the next radial projection 11A with respect to the tire rotation direction, a fluid S3 flowing within stagnant portion (region) of the rotational wind S1 absorbs the stagnant heat on the front face side of the radial projection 11A, and flows into the rotational wind S1 again.

Thus, by the rotational wind S1 flowing over the edge portion E to be accelerated, and by the fluids S2, S3 absorbing the stagnant heat and flowing into the rotational wind S1 again, the tire temperature can be reduced over a wide range. The tire temperature can be reduced, particularly, at root portions of the radial projection 11A and the regions where the rotational wind S1 contacts in the vertical direction. When the circumferential projections 11B are arranged with multiple rows in the tire radial direction, the traveling wind behaves according to the same principle as for the rotational wind S1 described above.

When the circumferential projections 11B are arranged in one row in the tire radial direction, as shown in FIG. 16(b), with the rotation of the pneumatic tire 1, a traveling wind S10 generated from the front of the vehicle is separated from the tire surface 9 by the circumferential projection 11B, and flows over the edge portion E of the front side of the circumferential projection 11B to be accelerated to the rear of the vehicle.

Then the accelerated traveling wind S10 flows approximately perpendicular to the tire surface 9 (so-called downward flow) on the back side of the circumferential projection 11B. At this point, a fluid S20 flowing within stagnant portion (region) of the traveling wind S10 absorbs the stagnant heat on the back side of the circumferential projection 11B, and flows again into the traveling wind S10.

Thus, by the traveling wind S10 flowing over the edge portion E of the front side of the circumferential projection 11B to be accelerated, and by the accelerated traveling wind S10 (downward flow) and the fluid S20 absorbing the stagnant heat and flowing into the traveling wind S10 again, the tire temperature, particularly in the neighborhood of the bead portion 3 can be reduced, thus the durability of the tire can be increased.

Also, by the separate provision of the radial projection 11A and the circumferential projection 11B, compared with the continuous provision thereof, heat exchange between the tire surface 9 and the rotational and the traveling winds flowing over the turbulent flow generation projection 11 is enhanced, thus the heat dissipation rate of the tire temperature can be further increased.

By making the projection-to-radial direction inclined angle (θ1) satisfy the range of −30°≤θ1≤30° and making the projection-to-circumferential direction inclined angle (θ2) satisfy the range of −20°≤θ1≤20°, the heat dissipation rate of the tire temperature can be efficiently increased by the rotational wind and the traveling wind.

By making the ratio of the projection height (h) to the projection width (w) satisfy the relationship of 1.0≤h/w≤10, the tire temperature, particularly in the neighborhood of the bead portion 3 can be effectively reduced by the rotational wind and the traveling wind which are accelerated after flowing over the turbulent flow generation projection 11.

In particular, since a construction vehicle (for example, a dump truck, a grader, a tractor, and a trailer) is not provided with a tire cover which covers each tire (such as fender), even if the speed of the vehicle is low (for example, 10 to 50 km/h), the rotational wind and the traveling wind which flow over the turbulent flow generation projection 11 can be accelerated by applying the above-mentioned the turbulent flow generation projection 11 to the heavy-duty tire mounted on such construction vehicles, thus the tire temperature can be reduced.

(6) Other Embodiments

As described above, the contents of the present invention have been disclosed through the embodiments of the present invention; however, it should be understood that the discussion and the drawings which form a part of the disclosure does not limit the present invention.

Specifically, when the upper surface of the turbulent flow generation projection 11, which is approximately parallel to the tire surface 9, and the tire surface 9 are flat surfaces, these opposite surfaces does not necessarily need to be parallel. For example, the opposite surfaces may be inclined (upward, downward) to the tire rotation direction (vehicle traveling direction), or may be asymmetrical.

Though the embodiments where the radial projection 11A and the circumferential projection 11B are separately provided have been described, the invention is not limited to these embodiments, and the radial projection 11A and the circumferential projection 11B may be continuously provided. In short, the radial projection 11A and the circumferential projection 11B may be integrally formed.

Though the pneumatic tire T1 was described as a heavy-duty tire, the invention is not limited to this case, and the pneumatic tire T1 may be for general radial tire or bias tire for passenger vehicles.

From the disclosure, various alternative embodiments, examples, and operational techniques will become apparent to those skilled in the art. The technical scope of the present invention is only defined by the specification of the invention according to the reasonable claims by the above description.

INDUSTRIAL APPLICABILITY

As described above, the pneumatic tire according to the present invention can reduce the tire temperature, particularly in the neighborhood of the bead portion and can increase the durability of the tire, thus the pneumatic tire is useful for tire manufacturing technology.

The invention claimed is:

1. A pneumatic tire comprising at least a turbulent flow generation projection configured to generate a turbulent flow, the turbulent flow generation projection being arranged in a range from a maximum tire width position to an outside bead position, the maximum tire width position being a position on a tire surface with maximum tire width, and the outside bead position being a position on an outside of a bead portion in a tire radial direction, the bead portion configured to be in contact with a rim flange, wherein the turbulent flow generation projection includes a radial projection extending along the tire radial direction, and a circumferential projection extending in an approximately circular arc shape along a tire circumferential direction, wherein the radial projection and the circumferential projection are separately provided, wherein a projection height (h) is set to 8 mm to 20 mm, wherein a relationship of 1.0≤h/w≤10.0 is satisfied where "h" is the projection height from the tire surface to a most protruded position of the turbulent flow generation projection, and "w" is a width of a lower side of a cross section approximately perpendicular to an extending direction of the turbulent flow generation projection, and wherein the pneumatic tire is a heavy-duty tire.

2. The pneumatic tire according to claim 1, wherein a projection width (w) which is a width of a lower side of a cross section of the turbulent flow generation projection is set to 2 to 10 mm, the cross section being taken approximately perpendicular to the extending direction of the turbulent flow generation projection.

3. The pneumatic tire according to claim 1, wherein a projection-to-rim distance (d) from an innermost position of the circumferential projection to an outermost position of the rim flange in the tire radial direction in a cross section in a tread width direction is set to 30 to 200 mm.

4. The pneumatic tire according to claim 1, wherein the turbulent flow generation projection is formed with an approximately quadrangular shape in a cross section approximately perpendicular to the extending direction.

5. The pneumatic tire according to claim 1, wherein the turbulent flow generation projection is formed with an approximately trapezoidal shape in a cross section approximately perpendicular to the extending direction.

6. The pneumatic tire according to claim 1, wherein the turbulent flow generation projection is formed with an approximately triangular shape in a cross section approximately perpendicular to the extending direction.

7. The pneumatic tire according to claim 1, wherein the turbulent flow generation projection is formed with a stepped shape having a step in a cross section approximately perpendicular to the extending direction.

8. The pneumatic tire according to claim 1, wherein the turbulent flow generation projection has a through hole formed to penetrate therein in a direction approximately perpendicular to the extending direction.

9. The pneumatic tire according to claim 1, wherein relationships of 1.0≤p/h≤20.0 and 1.0≤(p−w)/w≤100.0 are satisfied where "h" is the projection height from the tire surface to the most protruded position of the turbulent flow generation projection, "p" is a pitch between adjacent turbulent flow generation projections, and "w" is the projection width.

10. The pneumatic tire according to claim 1, wherein a projection-to-radial direction inclined angle (θ1), which is an inclined angle of the radial projection to the tire radial direction, satisfies a range of −30°≤θ1≤30°.

11. The pneumatic tire according to claim 1, wherein a projection-to-circumferential direction inclined angle (θ2), which is an inclined angle of the circumferential projection to the tire circumferential direction satisfies a range of −20°≤θ2≤20°.

12. The pneumatic tire according to claim 1, wherein the turbulent flow generation projection is arranged only within the range from the maximum tire width position to the outside bead position.

13. The pneumatic tire according to claim 1, wherein the circumferential projection is pointed to the sidewall of the radial projection, and the circumferential projection is perpendicular to the radial projection.

* * * * *